(12) United States Patent
Loehle et al.

(10) Patent No.: US 7,758,311 B2
(45) Date of Patent: Jul. 20, 2010

(54) PART SPAN SHROUDED FAN BLISK

(75) Inventors: Kenneth Loehle, Lynn, MA (US); James A. Huffman, Topsfield, MA (US); Charles K. Christopherson, Andover, MA (US); Alan Glen Turner, Cincinnati, OH (US); Jeffrey F. Wessels, Cincinnati, OH (US); Gary Edward Trewiler, Loveland, OH (US); Peter J. Rock, Byfield, MA (US); Paul S. Manicke, West Chester, OH (US); Joseph Capozzi, North Reading, MA (US); Jeffrey Howard Nussbaum, Wilmington, MA (US); Leslie M Pommer, Peabody, MA (US)

(73) Assignee: General Electric Company, Schenectady, NY (US)

( * ) Notice: Subject to any disclaimer, the term of this patent is extended or adjusted under 35 U.S.C. 154(b) by 711 days.

(21) Appl. No.: 11/548,745

(22) Filed: Oct. 12, 2006

(65) Prior Publication Data

US 2008/0089788 A1 Apr. 17, 2008

(51) Int. Cl.
*F01D 5/22* (2006.01)
(52) U.S. Cl. ............... 416/196 R; 416/500; 416/241 R
(58) Field of Classification Search ................ 416/190, 416/196 R, 195, 212 A, 213 R, 500, 241 R
See application file for complete search history.

(56) References Cited

U.S. PATENT DOCUMENTS

| | | | | |
|---|---|---|---|---|
| 2,472,886 A | * | 6/1949 | Conrad et al. | 416/193 R |
| 3,477,795 A | * | 11/1969 | Beesley | 416/191 |
| 3,588,980 A | * | 6/1971 | Cogan | 29/889.72 |
| 4,257,741 A | * | 3/1981 | Betts et al. | 416/190 |
| 4,734,010 A | * | 3/1988 | Battig | 416/196 R |
| 4,798,519 A | * | 1/1989 | Zipps et al. | 416/191 |
| 5,137,426 A | * | 8/1992 | Rhoda | 416/191 |
| 5,562,419 A | | 10/1996 | Crall et al. | |
| 5,988,980 A | | 11/1999 | Busbey et al. | |
| 6,478,545 B2 | | 11/2002 | Crall et al. | |
| 6,779,979 B1 | | 8/2004 | Wadia et al. | |

* cited by examiner

*Primary Examiner*—Ninh H Nguyen
(74) *Attorney, Agent, or Firm*—Marcella R. Louke; William Scott Andes

(57) ABSTRACT

Including a disk, a plurality of circumferentially spaced apart airfoils extending radially outwardly from the disk, a plurality of shroud segments being disposed circumferentially between the plurality of airfoils and configured to attach to a corresponding airfoil of the plurality of airfoils and a plurality of wear surfaces, where at least one wear surface of the plurality of wear surfaces is configured and disposed to prevent excessive wear between the adjacent shroud segments. Each shroud segment of the plurality of shroud segments may be attached to a corresponding airfoil by weld connections to permit clearance during translation friction welding of the airfoil to the disk hub are located to avoid high stress areas.

23 Claims, 12 Drawing Sheets

PART SPAN SHROUDED FAN BLISK

BACKGROUND OF THE INVENTION

In an aircraft gas turbine (jet) engine, air is drawn into the front of the engine, compressed by a shaft-mounted compressor, and mixed with fuel. The mixture is combusted, and the resulting hot combustion gas is passed through a turbine mounted on the same shaft. The flow of gas turns the turbine by contacting an airfoil portion of the turbine blade, which turns the shaft and provides power to the compressor. The hot exhaust gases flow from the back of the engine, driving it and the aircraft forward. There may additionally be a bypass fan that forces air around the center core of the engine, driven by a shaft extending from the turbine section.

The compressor, the turbine, and the bypass fan have a similar construction. They each have a rotor assembly included in a rotor disk and a set of blades extending radially outwardly from the rotor disk. The compressor, the turbine, and the bypass fan share this basic configuration. However, the materials of construction of the rotor disks and the blades, as well as the shapes and sizes of the rotor disks and the blades, vary in these different sections of the gas turbine engine. Each rotor blade includes an airfoil and a dovetail at its root, with the dovetail being radially retained in a complementary slot in the perimeter of the disk. The dovetails must be suitably configured and sized for supporting the blades with a suitably low level of stress for obtaining a useful life in operation.

In some gas turbine engine designs, the conventionally known radius ratio and blade solidity are such that the blades are disposed relatively close together around the perimeter of the disk, with the disk being relatively small in diameter compared to the airfoils which results in the inability of conventional dovetail designs to carry centrifugal loading at suitable levels of stress for enjoying a useful service life. Accordingly, the airfoils are manufactured integrally with the disk in a one-piece component conventionally known as a bladed disk or a blisk, also sometimes known as an "integrally bonded rotor" or IBR. A blisk is typically manufactured from a one piece solid forging which is conventionally machined using either a mill or electrochemical machining (ECM) electrodes. With the blades being integral with the disk, satisfactory levels of stress may be obtained in the blisk during operation for obtaining a useful life.

The primary technique for making fan blisks that are aeromechanically stable is to increase the relative thickness of the blades. The thickness is measured in thickness divided by chord, or tm/c. As a result of the increased thickness of the blades, the airfoil must support more weight, thus the thickness of the blisk and fan case are likewise increased in order to provide adequate support for the extra airfoil material. As a result of the increased tm/c, the engine may experience performance penalties.

A continuous shroud in a blisk poses numerous manufacturing problems since the shroud itself significantly limits access to the region of the inner airfoils and inner diameter of the shroud itself which are formed by removal of material from the original solid forging. In order to reduce the drawbacks associated with continuous shrouds on blisks, part span shrouds are used on bladed designs. In this arrangement, the blades are separate and attached to the blisk with dovetails. Often dovetail stresses from a bladed design are too high for a feasible design, and the engines may utilize hollow and hybrid blades for weight reduction. However, hollow and hybrid blades suffer from the drawback that these parts are expensive, and have larger tm/c values for the stability margin. Further, the hollow and hybrid blades are also not practical for medium sized engines. Further still, manufacturing challenges prevent the part shrouds from being used on blisks.

Therefore, what is needed is a fan blisk with an integral part span shroud that avoids weight and performance penalties associated with a conventional non-shrouded blisk. The present invention fulfills this need, and further provides related advantages.

SUMMARY OF THE INVENTION

One embodiment of the present invention is directed to a fan blisk including a disk, a plurality of circumferentially spaced apart airfoils extending radially outwardly from the disk where each airfoil is secured to the disk, and a plurality of shroud segments where each shroud segment is disposed circumferentially between the plurality of airfoils and is configured to attach to a corresponding airfoil of the plurality of airfoils. Further, each shroud segment of the plurality of shroud segments is attached to a corresponding airfoil by weld connections in areas along the airfoil that avoid high stress.

Another embodiment of the present invention is directed to a method for a fan blisk including the steps of securing a plurality of blade airfoils to a disk and securing a plurality of shroud segments to the plurality of blade airfoils. Further, the plurality of shroud segments are part span shroud segments that span at least a portion of the distance between adjacent blade airfoils.

Yet another embodiment of the present invention is directed to a method for a fan blisk including the steps of providing a solid piece of metallic material, machining the piece to form a disk having a plurality of circumferentially spaced apart airfoils extending radially outwardly from the disk, each airfoil being secured to the disk and having a plurality of shroud segments that are part span shroud segments that span at least a portion of the distance between adjacent blade airfoils.

One advantage of the present invention is the increased aeromechanical stability of the blisk apparatus by use of a part span shroud.

Another advantage of the present invention is the reduced thickness of the airfoils, reducing weight and improving blisk aerodynamic performance.

Another advantage of the present invention is the location of the shroud welds that avoid the high stress areas of the blisk, which increases the reliability of the apparatus.

An additional advantage of the present invention is improved fan efficiency, avoided weight penalties, and an improved stall margin as compared to an unshrouded blisk.

Another advantage of the present invention is that the apparatus functions substantially as an unshrouded blisk, having the benefits of easier maintenance, but with the performance advantages set forth above.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

Wherever possible, the same reference numbers will be used throughout the drawings to refer to the same or like parts.

DETAILED DESCRIPTION OF THE INVENTION

Figure 1:
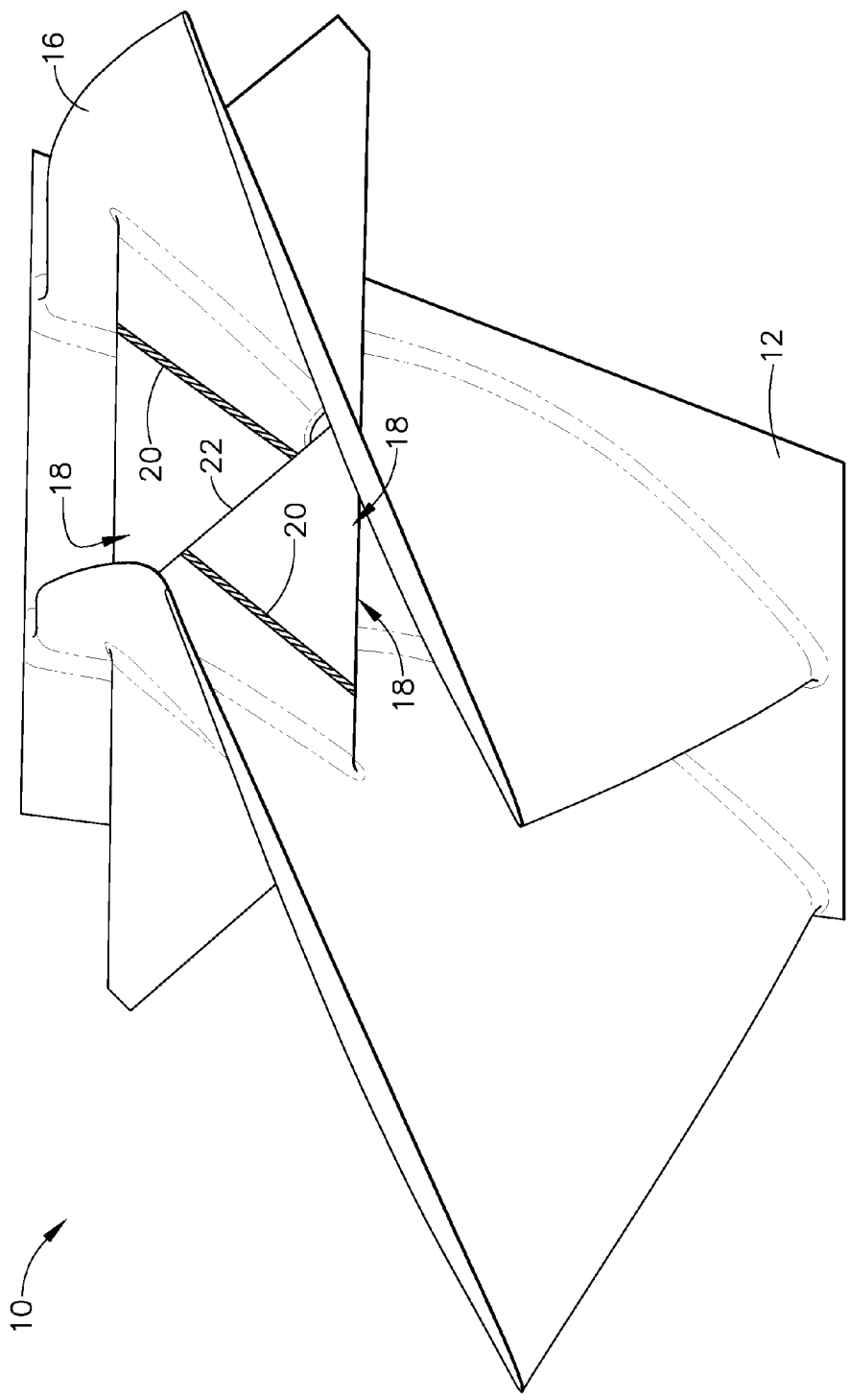
FIG. 1 is an illustration of the part span shroud on a fan blisk, according to an embodiment of the invention.

FIGS. 1, 2, 3A and 3B show various embodiment of a blisk 10. Blisk 10 can include a disk 12 or disk body, and a plurality of circumferentially spaced apart blade airfoils 16 extending integrally radially outwardly from disk 12. A plurality of shroud segments 18 are disposed circumferentially radially between blade airfoils 16, and connect thereto to increase the aeromechanic stability of blades 16 on the blisk 10. Weld connection 20 secures each of the plurality of shroud segments 18 to blade airfoils 16 and to the other shroud segments 18. Weld connections 20 on shroud segments 18 may include attachments resulting from welding processes including but not limited to, electron beam welding, laser welding, friction stir welding, induction welding, solid state welding and diffusion bonding and are located on shroud segments 18 to avoid high stress areas. In addition, a plurality of coated wear surfaces 22 are disposed between shroud segments 18 to prevent excessive wear on shroud segments 18. The excessive wear on shroud segments 18 can occur during operation of blisk 10, when vibrations caused by the rotation of disk 12 and blades 16, causing shroud segments 18 to rub against each other. Disk 12, airfoils 16, shroud segments 18 and weld connections 20 collectively form an integral or one-piece assembly.

The part span shrouded blisk 10 increases the stability of a fan blade airfoil, also referred to as a blade, or an airfoil 16 while decreasing the overall weight associated with higher stability blisks. FIG. 1 shows blisk 10 according to an embodiment of the invention showing part span shroud segments, also referred to as a shroud, or shroud segments 18 disposed between airfoils 16 with weld connections 20 disposed substantially parallel to each other on shroud segments 18 in areas that may sustain of lower stress levels. When applied, weld connections 20 are in a full line of sight and are disposed on shroud segments 18 between the center of shroud segments 18 and airfoils 16. The location of weld connections 20 between the center of shroud segments 18 and airfoils 16 provides a clear line of sight to weld connection 20, thereby providing an easier installation of shroud segments 18 and weld connections 20 to airfoils 16.

Figure 2:
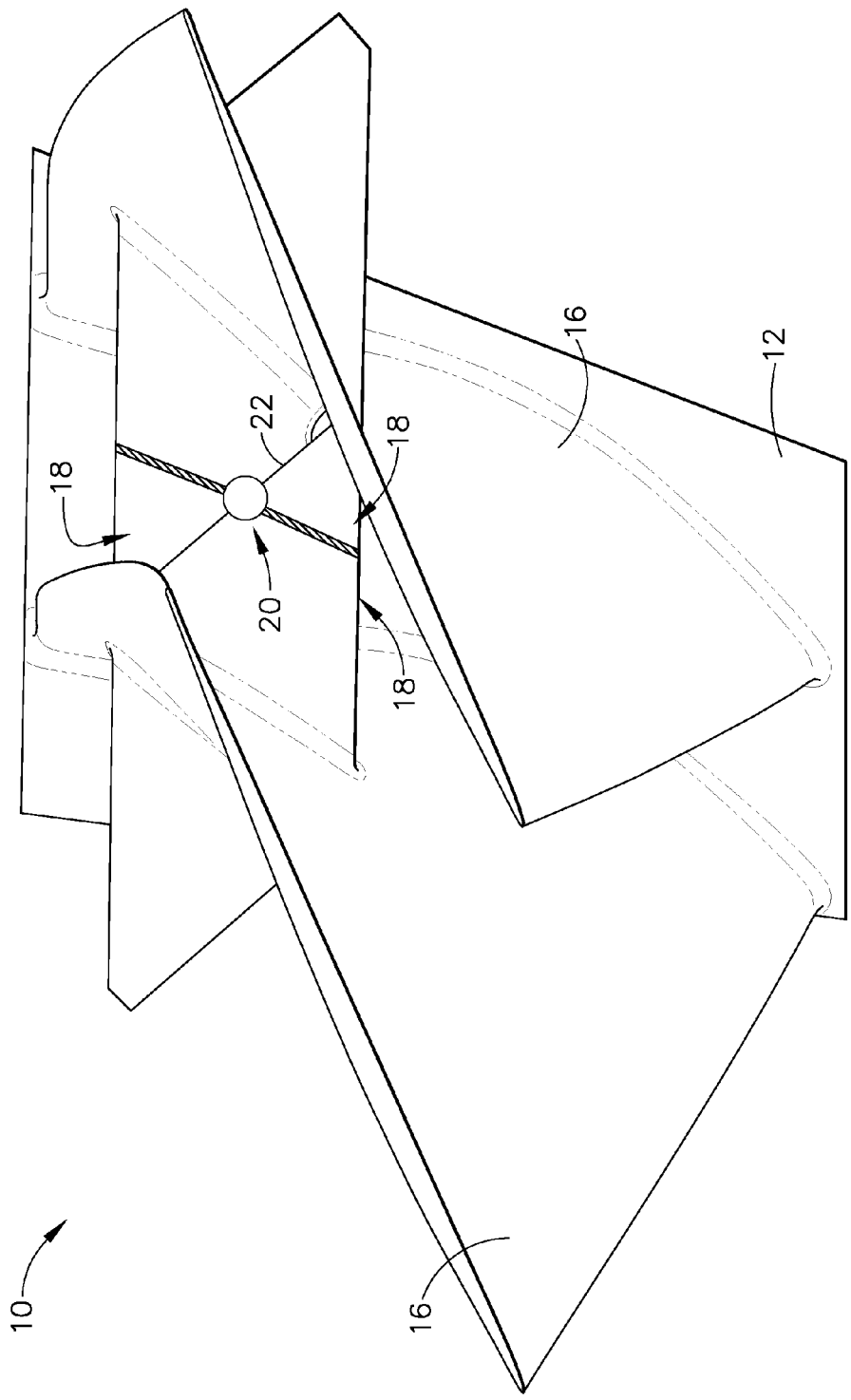
FIG. 2 is an alternative view of the fan blisk of FIG. 1.
Figure 3A:
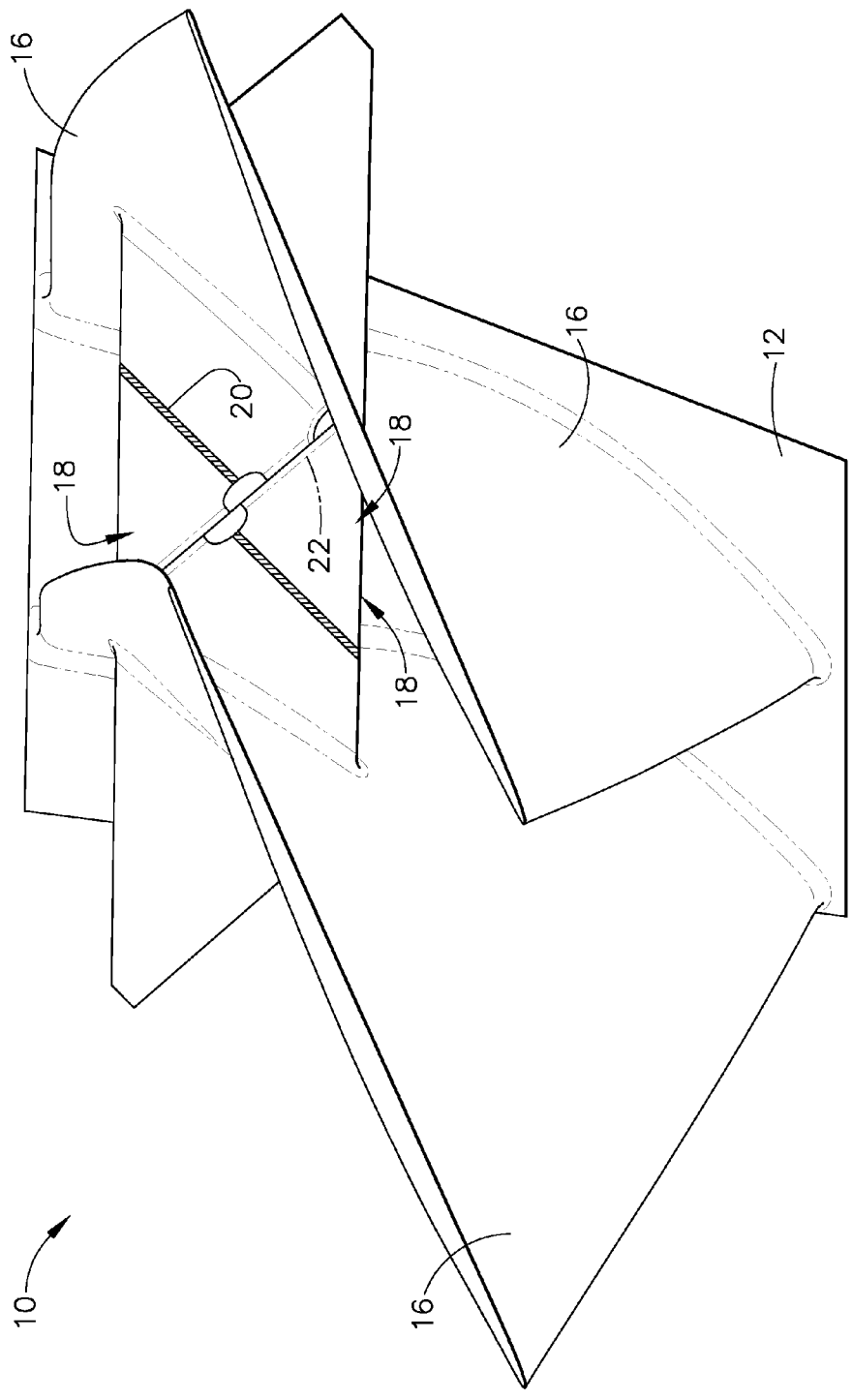
FIG. 3A is a perspective view of an alternate welding configuration on the part span shroud of a fan blisk according to the embodiments of the invention.
Figure 3B:
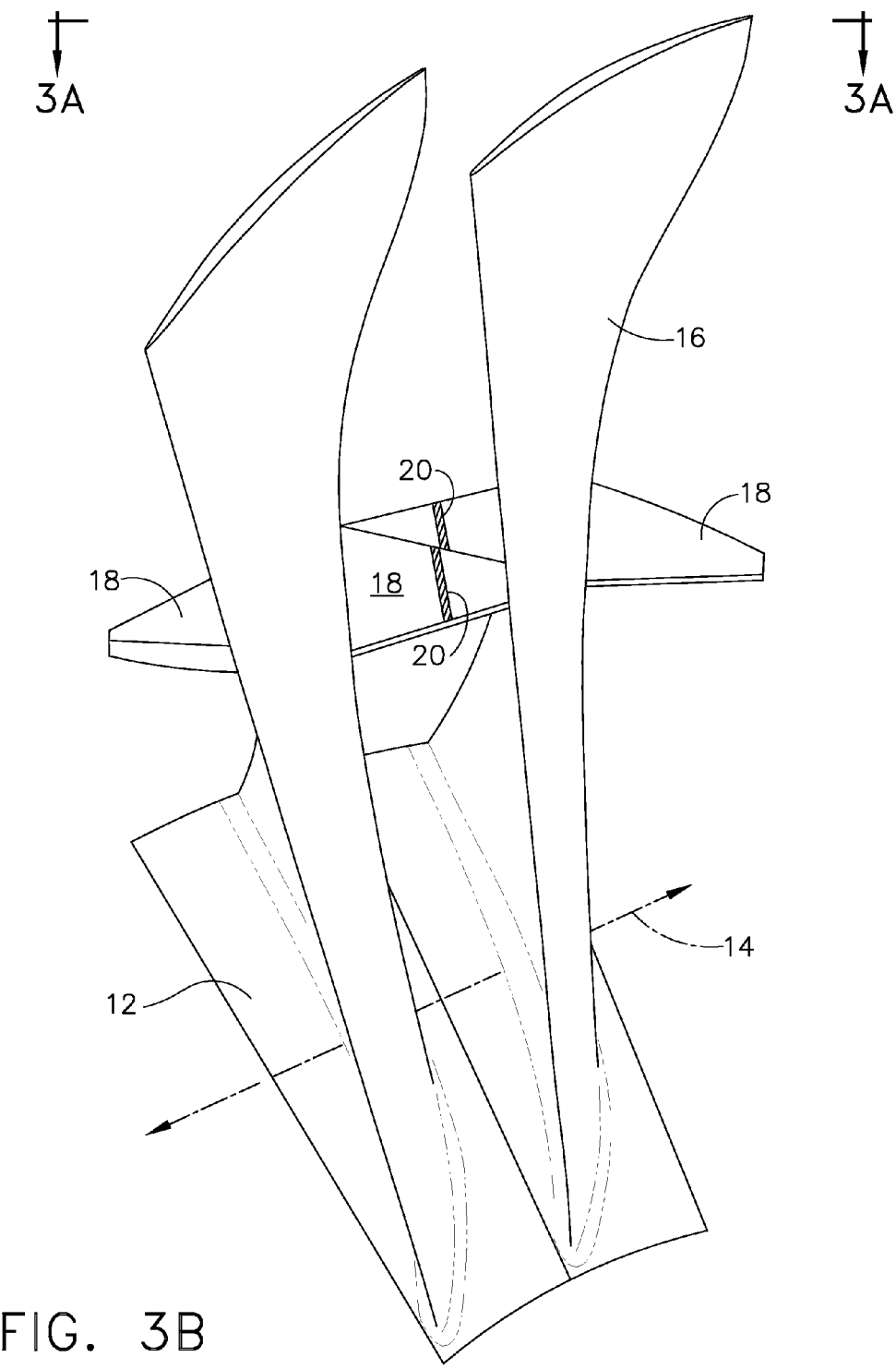
FIG. 3B is a front view of the part span shroud of FIG. 3A.

FIG. 2 shows blisk 10 with shroud segments 18 disposed between airfoils 16 with weld connections 20 disposed approximately in the center of shroud segments 18. With weld connection 20 disposed at approximately the center of shroud segments 18, weld connection 20 is disposed a distance from the fillet where airfoil 16 meets span shroud 18. FIG. 3A shows another view of blisk 10 with shroud segments 18 between airfoils 16 and with weld connections 20 disposed between airfoils 16 such that weld connections 20 are substantially parallel to each other, but offset from the centerline between airfoils 16, and offset from the other weld connection 20. Weld connections 20 being offset from the centerline between airfoils 16 better facilitate the weld process by providing a clear line of sight to shroud segments 18 and weld connections 20 and by providing an easily accessible area for weld connections 20 between airfoils 18. FIG. 3B shows a front view of blisk 10 configuration according to one embodiment of the invention with shroud segments 18 disposed between airfoils 16 with weld connections 20 disposed offset from the centerline between airfoils 16.

Figure 4:
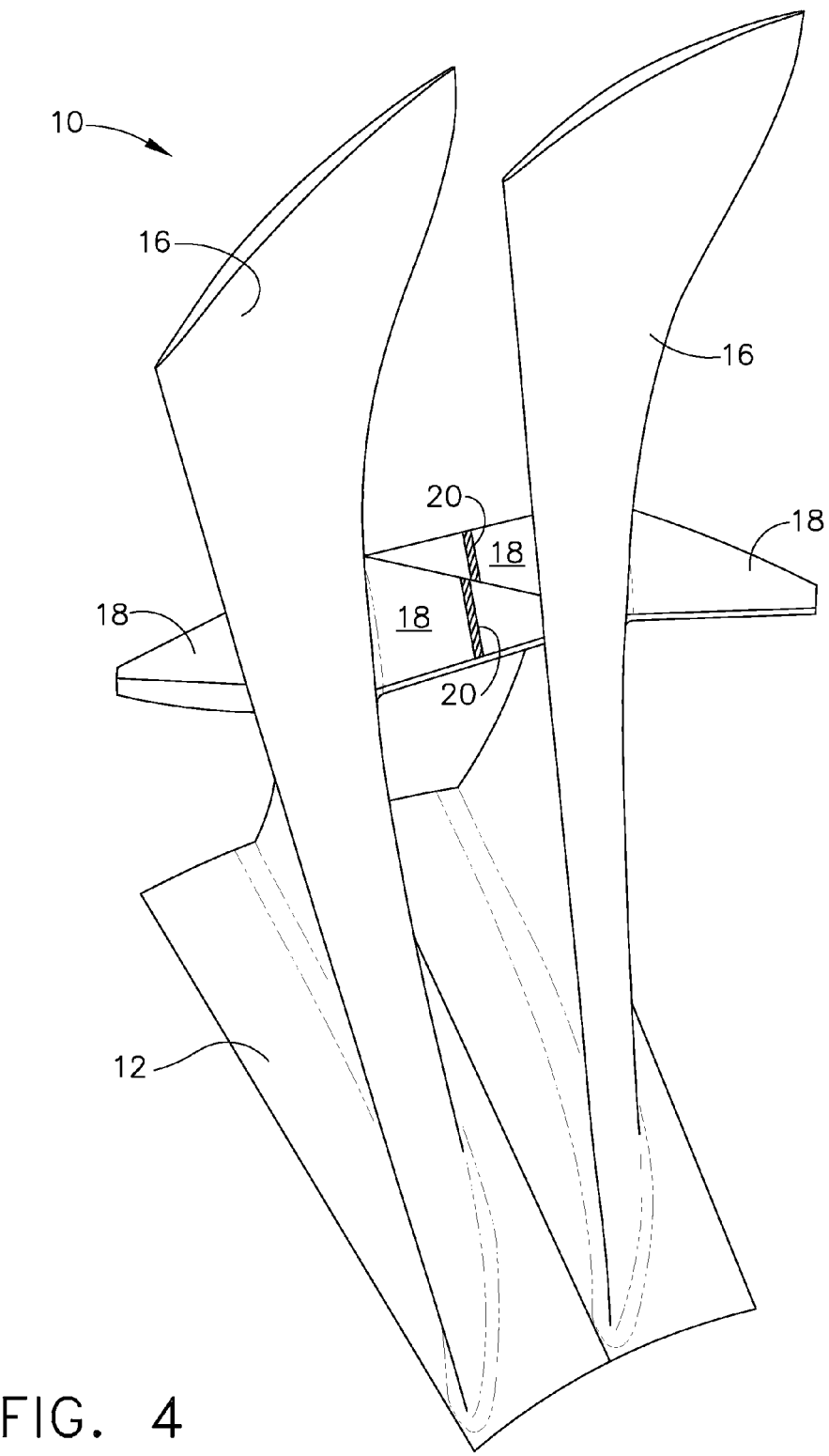
FIG. 4 is a perspective view of an alternate embodiment of the invention.
Figure 5:
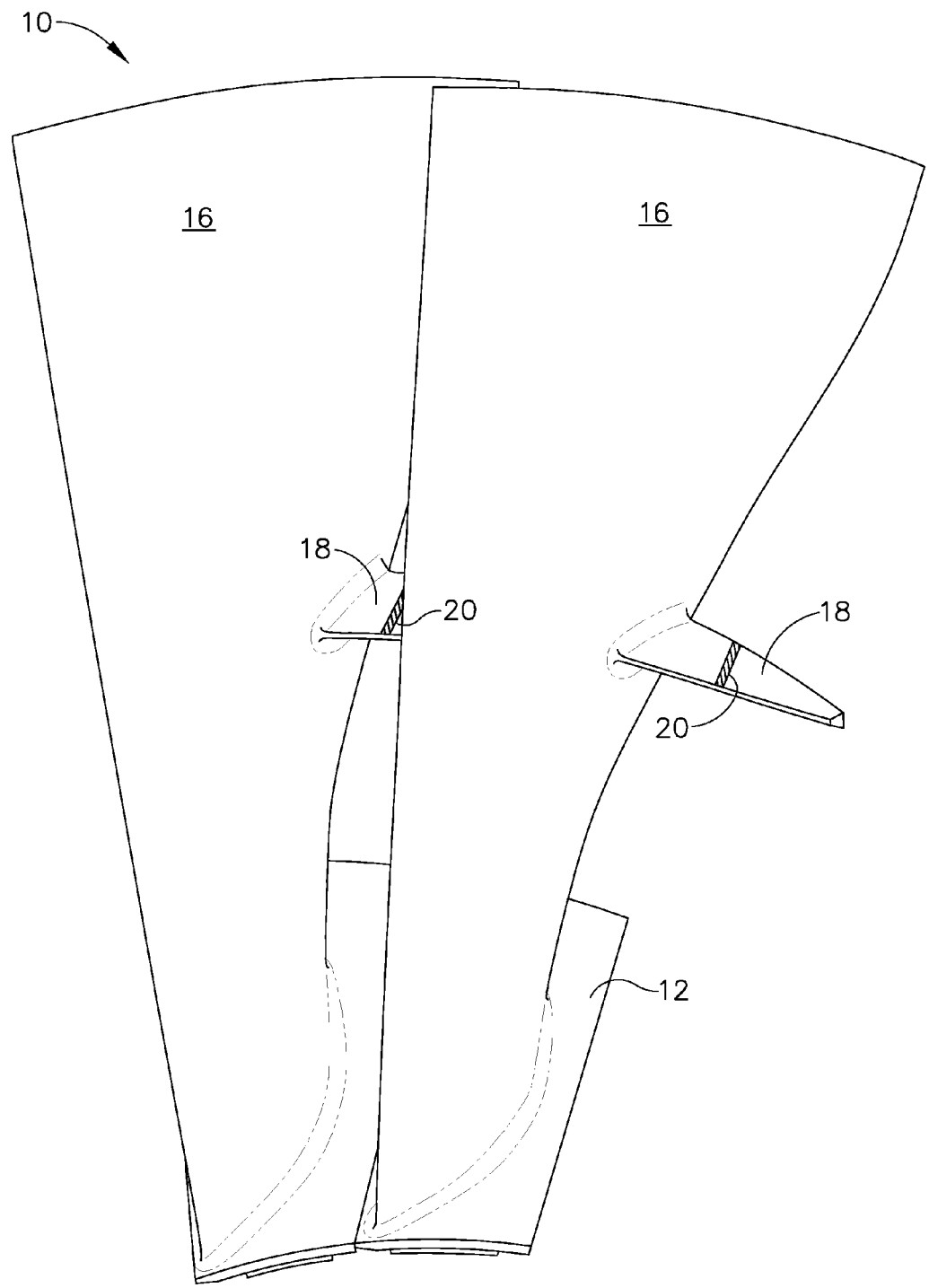
FIG. 5 is an alternate view of the embodiment of FIG. 4.
Figure 6:
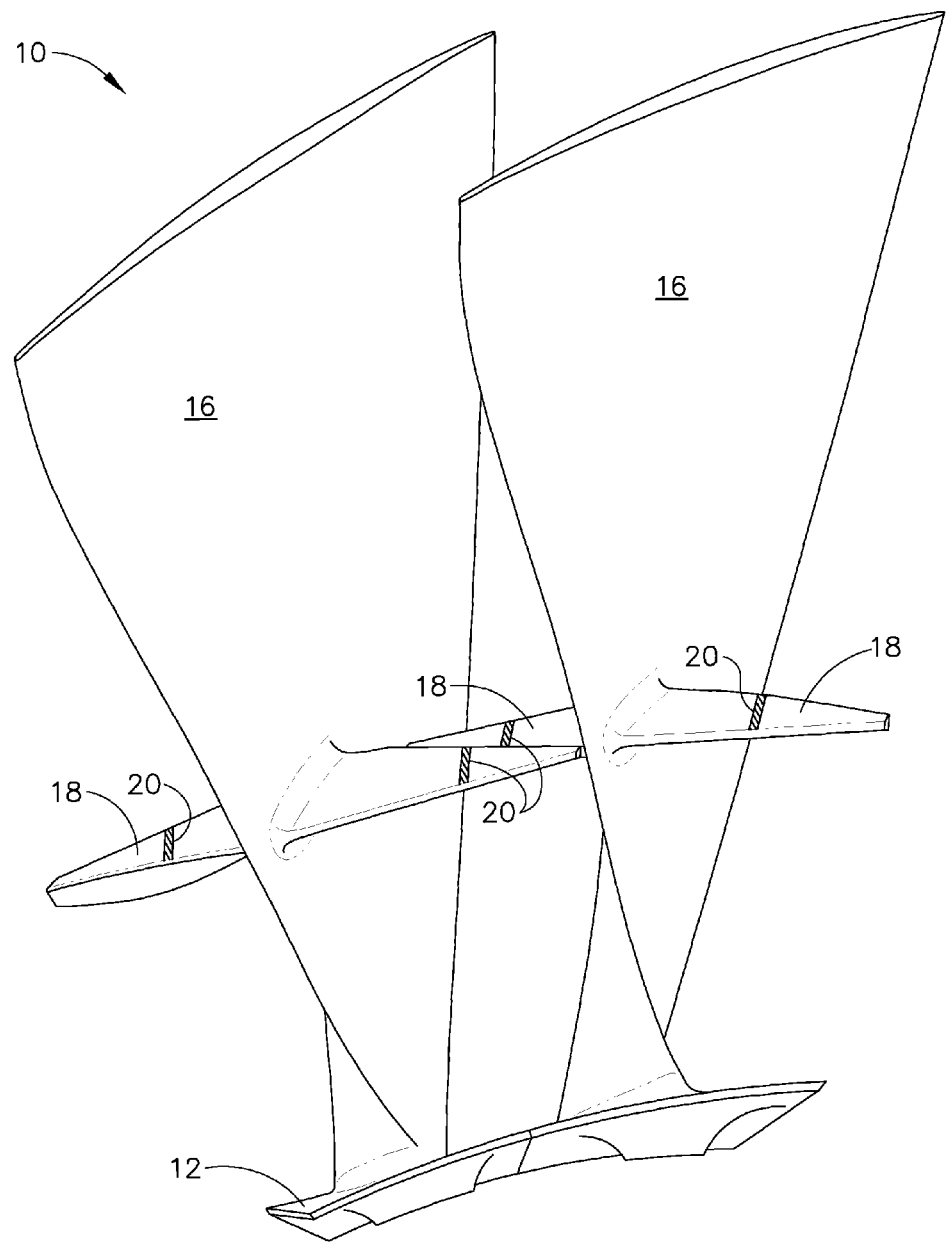
FIG. 6 is an alternate view of the embodiment of FIG. 4.

FIGS. 4, 5 and 6 show a portion of blisk 10 with shroud segments 18 connected to blades 16. FIG. 4 shows a front view a blisk 10 with shroud segments 18 disposed offset from the centerline between airfoils 16. FIG. 5 shows blisk 10 with shroud segments 18 disposed between airfoils 16. Weld connections 20 are disposed along shroud segments 18 between the end of shroud segment 18 and airfoil 16. FIG. 6 shows a rear view of blisk 10 showing shroud segments 18 disposed between airfoils 16 with weld connections 20 disposed along shroud segments 18 between the end of shroud segment 18 and airfoil 16. Blisk 10 may include a plurality of discrete part-span shroud segments 18 each disposed circumferentially between and bridging a respective pair of blade airfoils 16. Weld connections 20 of shroud segments 18 to blade airfoils 16 are disposed in areas that avoid the high stress areas of shroud segments 18.

One method for manufacturing blisk 10 includes attaching blade airfoils 16 to disk 12 first, and then securing shroud segments 18 to blade airfoils 16 after airfoils 16 are secured. Blade airfoils 16 may be attached to disk 12 by any suitable attachment method known in the art, including but not limited to translation friction welding, electron beam welding, induction welding, solid state welding and forming disk 12 and airfoil 16 from the same piece of material. Blade airfoils 16 and shroud segments 18 may be attached by a weld connection 20 with a modified shroud interface orientation, which provides a more producible weld during the assembly of the present invention. Another suitable location for weld connection 20 on shroud 18 may be closer to airfoils 16, which provides better interfaces with the adjacent shroud, and provides better shroud-to-shroud interface alignment.

Another embodiment includes shroud segments 18 being integral with the blade airfoils 16. Blade airfoils 16 are secured to disk 12 with weld connection 20. Weld connection 20 may be applied by a translational friction welding process or by any other suitable attachment process. Shroud segments 18 are coated with a coating or material known in the art for blade airfoil 16 surfaces. For example, the coating may be made of tungsten carbide, or may be a brazed on wear pad. This embodiment may also include having every other shroud segment 18 split into a plurality of shroud segments, preferably two segments. Blades 16 are then secured one at a time to disk 12 with weld connection 20. Adjacent blades 16 are elastically bent out of the way during the weld process to avoid interference with the weld process. While no welds are necessary for the shrouds for this configuration, induction welding or another suitable joining method may be used to attach the integral blade 16 to blisk 10.

Figure 7:
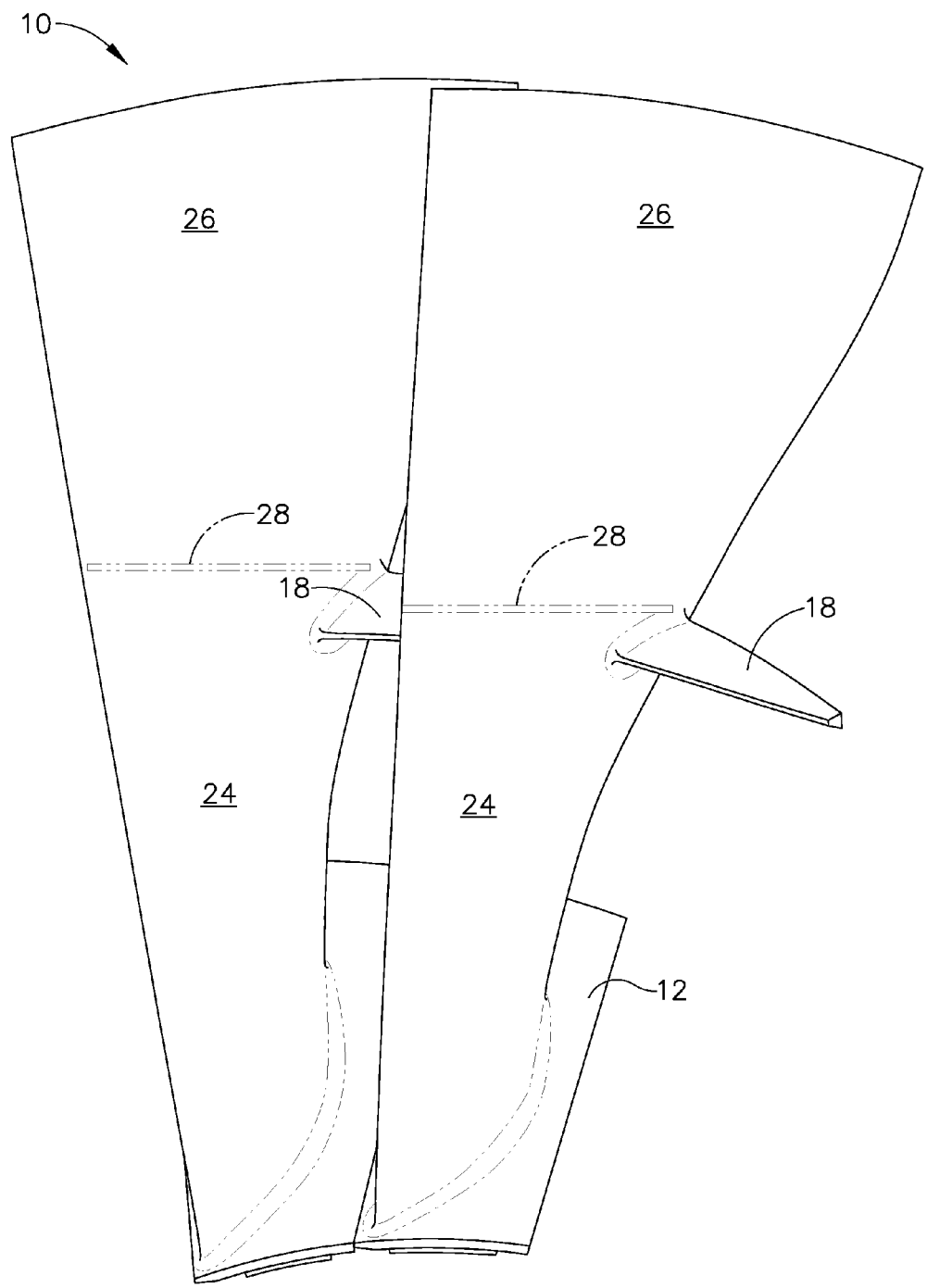
FIG. 7 is an illustration of an alternate embodiment of a part span shroud welding configuration.

FIG. 7 shows yet another embodiment of blisk 10, where blade airfoils 16 have two sections, a first section 24 and a second section 26, with a connection junction 28 between first section 24 and second section 26. Each of the first section 24 and second section 26 are blade airfoil components, and when joined at the connection junction 28, form a complete airfoil. First section 24 of airfoils 16 is attached to disk 12 or machined integral with disk 12 during manufacture. Then shroud segments 18 are attached to first section of airfoils 16. Once shroud segments 18 are attached to first section 24, second section 26 is attached. The attachment of first section 24 and second section 26 are made by machining first section 24 of blades 16 and shroud segments 18 to disk 12, then using weld connection 20 to attach second section 26 of blade airfoils 16. Another attachment used for this embodiment is to machine first section 24 of blade 16, then using weld connections 20 for securing shroud segments 18 and second sections 26 of blade 16. This process is repeated around disk 12 until blisk is formed. This embodiment allows for easy attachment of the shroud segments by conventional welding techniques.

Figure 8:
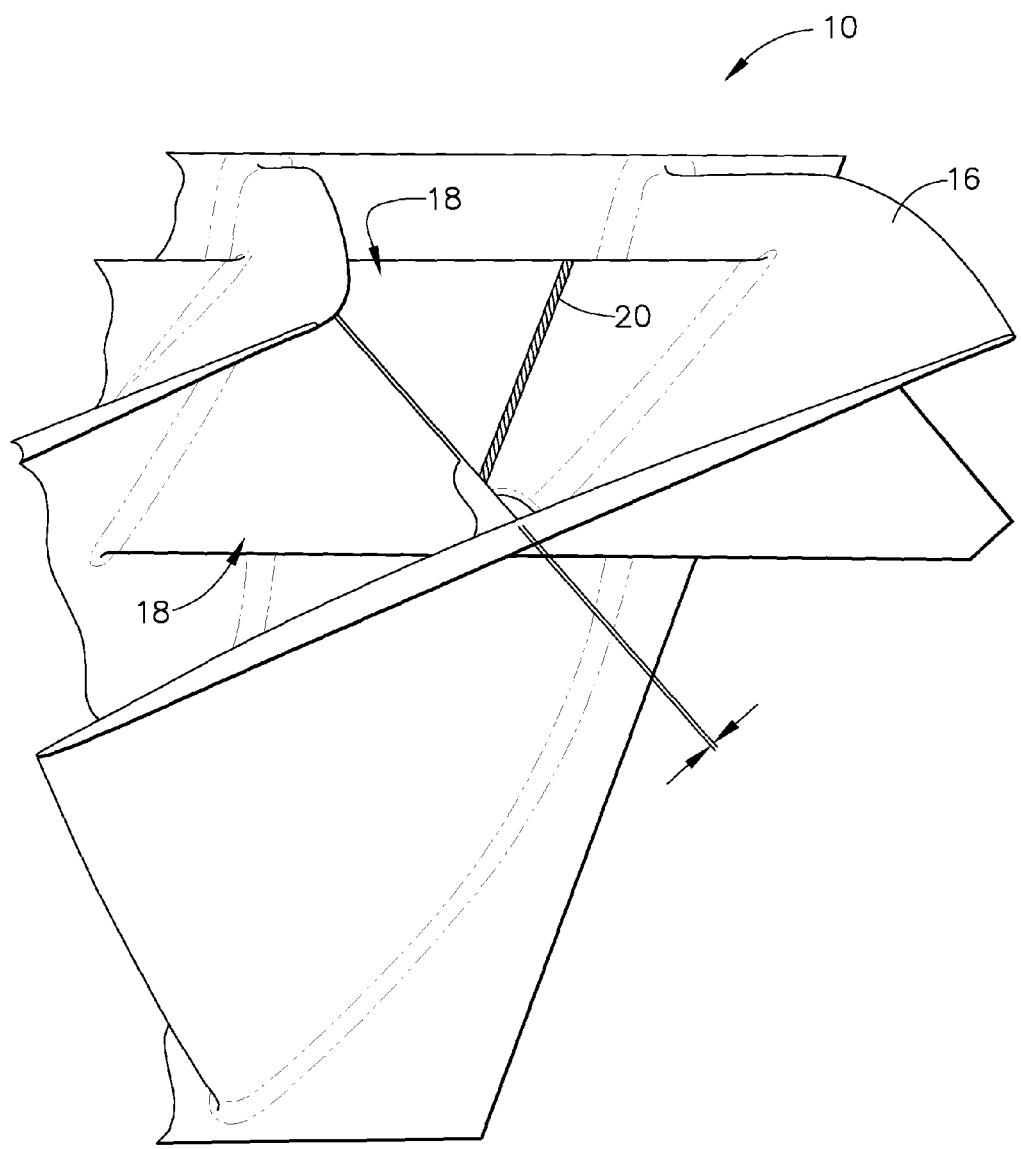
FIG. 8 is an illustration of the present invention with only one weld connection.

FIG. 8 shows another blisk where only one weld connection 20 is applied to shroud segments 18 between airfoils 16. Weld connection 20 is applied substantially perpendicular to the edge of shroud segment 18. A gap clearance must be maintained from the adjacent shroud 18 without weld connection during application of weld 20. Shroud segment 18 without weld connection 20 may be either removed or deflected during the welding process if necessary. The gap clearance provides clearance from the adjacent airfoil and shroud during translation friction welding the airfoil 16 to the blisk 10.

Figure 9:
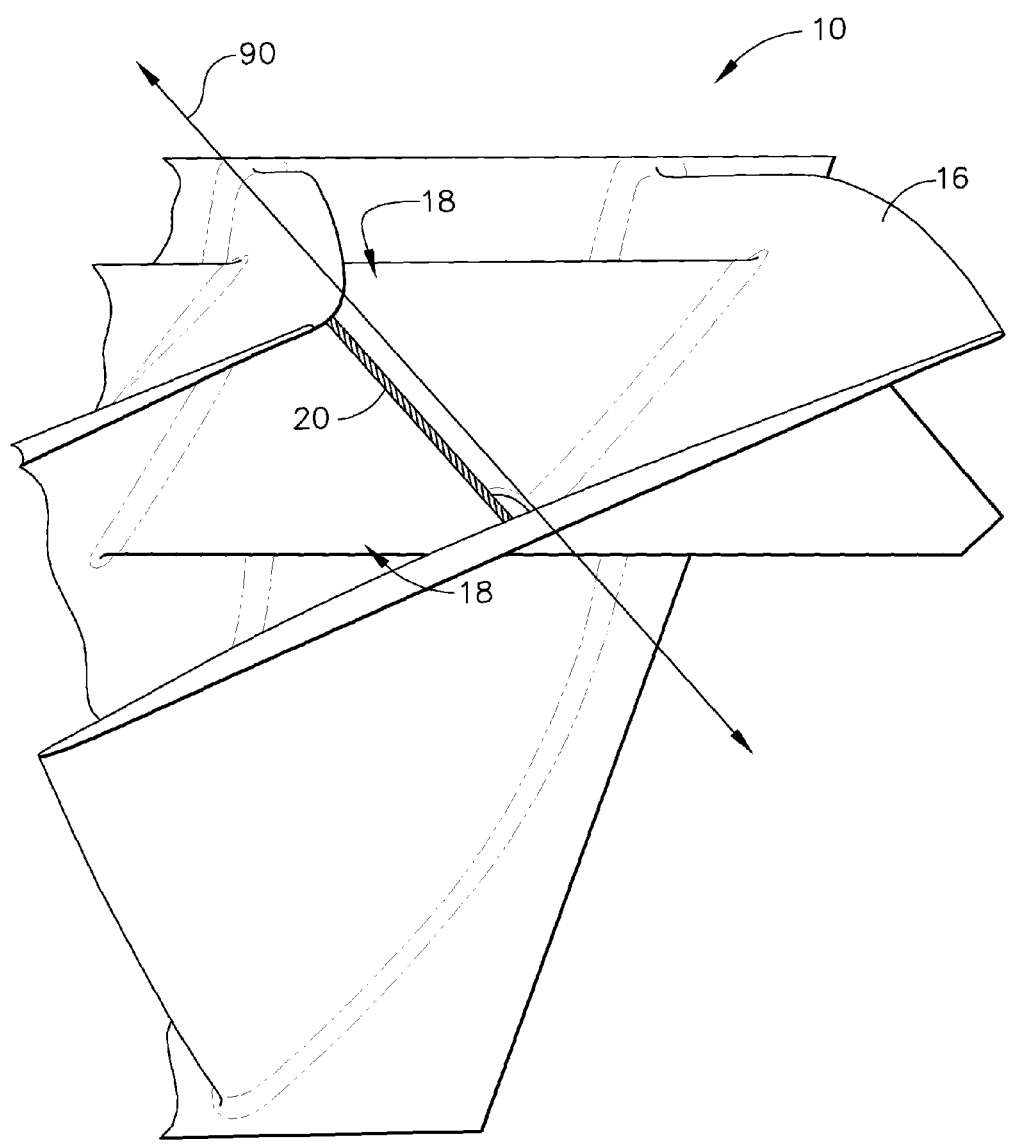
FIG. 9 is an illustration of the present invention with a weld connection substantially parallel to the shroud interface.

FIG. 9 shows blisk 10 where weld connection 20 is applied to shroud 18 substantially perpendicular to airfoil 16. Weld connection 20 is substantially parallel to the shroud interface between shroud segments 18. Line 90 illustrates the direction of translation for the translation friction weld process of this configuration. Airfoils 16 may be deflected during the weld process for clearance from the adjacent airfoil. This configuration assumes a tolerance substantially perpendicular to the axis of translation of shroud 18 and avoids welds in shroud 18.

Figure 10A:
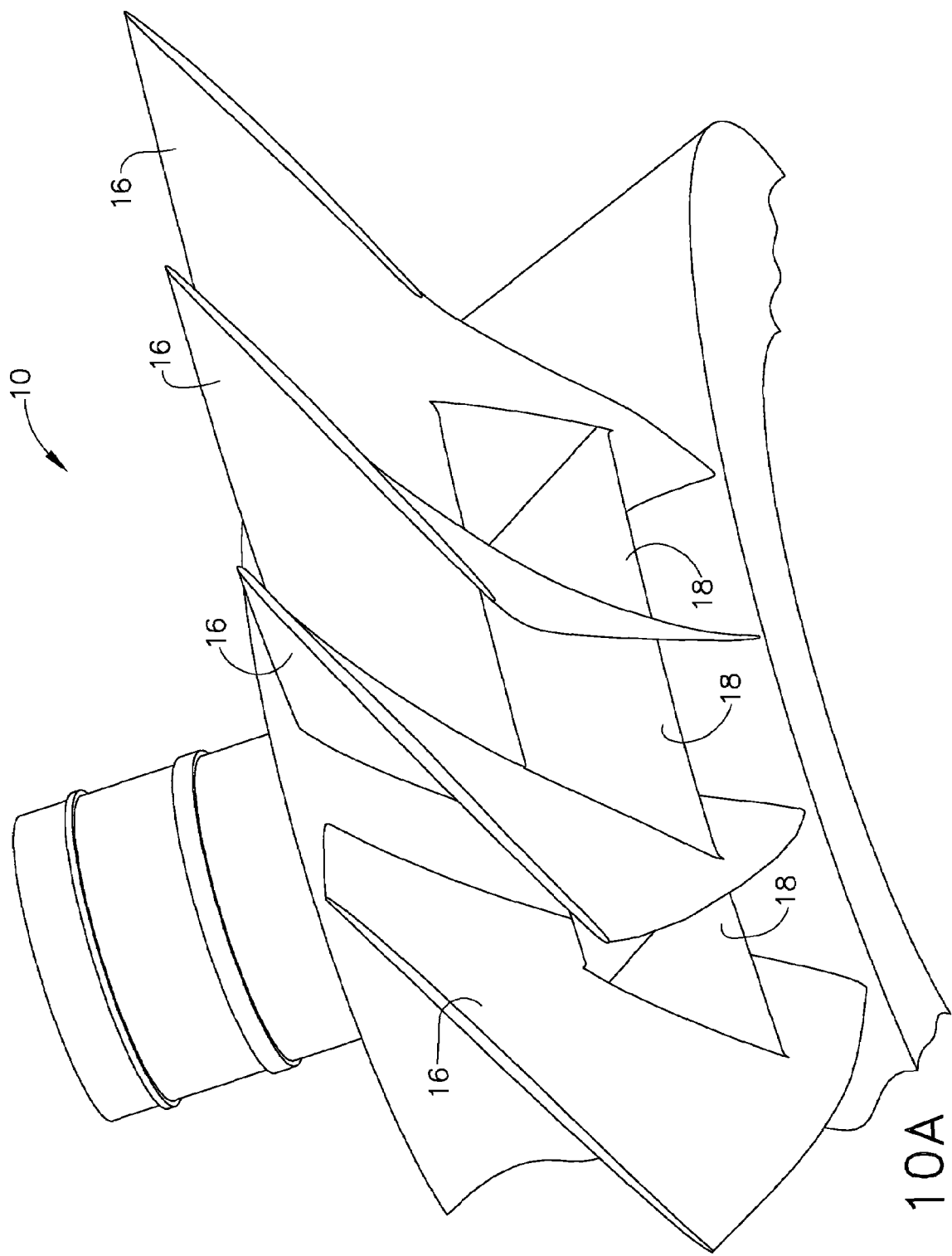
FIG. 10A is an illustration of the present invention where the airfoils are attached in pairs.
Figure 10B:
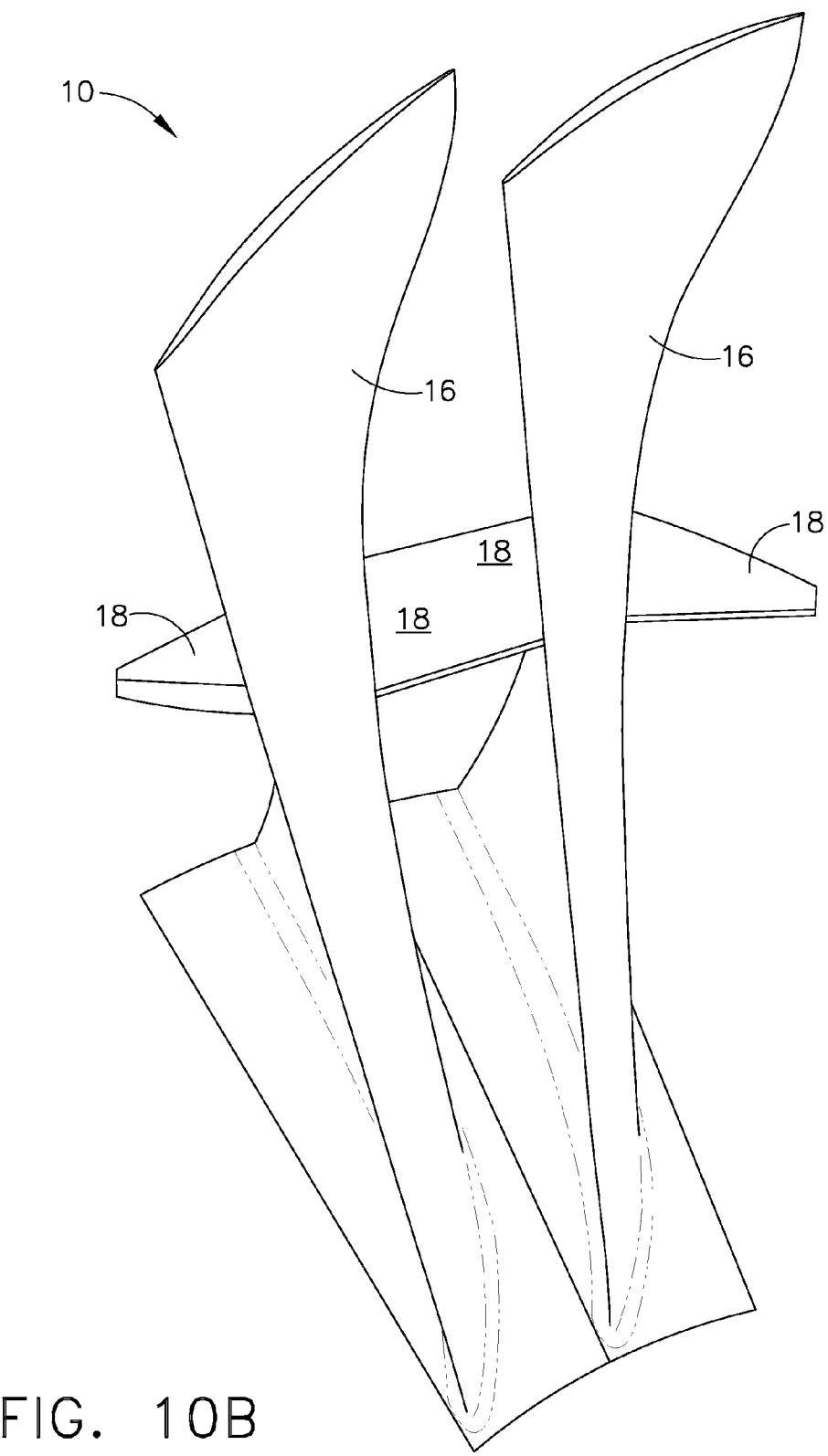
FIG. 10B is an alternate view of FIG. 10A where the shroud segments are connected before the airfoils are attached to the blisk.

FIG. 10A shows another configuration of blisk 10 where airfoils 16 are attached to disk 12 in pairs, or in other words, airfoils 16 are attached to disk 12 two at a time. Shroud segments 18 are coated with a wear coating at every other interface only since blade airfoils 16 are attached two at a time. In addition, every other shroud segment 18 has a clearance gap for the translational friction weld clearance. Shroud 18 is only disposed there to avoid aeromechanic excitation from non-uniform wake disturbance. Shroud segments 18 are joined before the pair of blade airfoils 16 are attached to disk 12, as shown in FIG. 10B.

Another embodiment of the present invention is to utilize weld connections 20 for shroud segments 18 and blade airfoils 16, but leaving gaps between shroud segments. The shroud-to-shroud gap has an assembled wear surface between the two shroud pieces. This shroud-to-shroud gap provides damping during blade vibrations and prevents hoop stresses that occur in when the shrouds are connected as a continuous ring. Wear surfaces 22 are secured after shroud segments 18 and blade airfoils 16 are secured. This is repeated around disk 12 to form blisk 10.

Another embodiment of the present invention leaves a gap between shroud segments 18. A wear surface 22 is assembled, manufactures, or used to fit in the gap. A weld connection 22 may or may not be used to secure shroud 18 to blade airfoil 16. This embodiment provides required stiffness of airfoils 16 required for operation of blisk 10, while increasing the first flex frequency of blades 18. The gap provides blade-to-blade damping that can reduce stresses in the shroud 18 and blade airfoils 16. The process of leaving the gap between shroud 18 and then later assembling wear surface 22 in the gap provides easier assembly of blisk, as shrouds 18 are not in danger of making contact with one another during the welding process.

Another embodiment of the present invention includes manufacturing the entire blisk 10 from a single material, having no weld connections 20. Blisk 10 may be manufactured from a metal material such as titanium or any other suitable metal material by a machining process. Shrouds 18 can be machined integrally to airfoils 16 as one solid piece and form a continuous ring. In this embodiment, wear surface 22 may be omitted. Shroud 18 may be machined as one solid piece, but each shroud segment 18 may have a gap sufficiently large enough to ensure that the edges of shroud 18 do not contact each other. Wear surface 22 may also be used to fit into the gap between shroud segments 18 to provide damping between shroud segments 18. The gap may eliminate at least a portion of hoop stresses that may occur on shrouds 18 and blade airfoils 16. Shroud 18 may provide aeromechanical stiffness to blade airfoils 16. Machining blisk 10 from a single solid piece of material may eliminate the need for wear surfaces 22.

Another embodiment manufactures blisk 10 using composite materials and composite manufacturing techniques. Blisk 10 may be constructed of natural fiber substrates, fiberglass substrates, open cell foams, closed cell foams, vinyl, and any other suitable composite. The composite manufacturing techniques may include resin transfer molding, filament winding, autoclaving, pultrusion, hot pressing, wet layup, carbon pyrolysis, braiding or any other suitable technique. Characterization capabilities include ultrasonics, acoustic emission, X-radiography, infrared thermography, eddy current, thermal analysis, microscopy and any other suitable characterization. Composite materials performance may be evaluated with a comprehensive array of testing equipment such as servo-hydraulic and screw-driven load frames, a high-rate servo-hydraulic load frame with high speed laser flash video recording, high temperature creep frames, an instrumented drop-weight impact tester, environmentally-controlled wear testers, a vacuum-ready flywheel spin chamber and any other suitable evaluation method or system.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An engine component comprising:
   a fan blisk, the fan blisk comprising:
   a disk body having a substantially circular geometry;
   a plurality of circumferentially spaced apart airfoils extending radially outwardly from the disk body, each airfoil being secured to the disk body;
   a plurality of shroud segments, each shroud segment being disposed circumferentially between the plurality of airfoils and configured to attach to a corresponding airfoil of the plurality of airfoils;
   wherein each shroud segment is attached to another shroud segment of the plurality of shroud segments by a weld connection on a predetermined location of the shroud segment, wherein each shroud segment of the plurality of shroud segments is a part span shroud segment; and a plurality of wear surfaces disposed between the part span shroud segments to prevent excessive wear between the adjacent shroud segments.

2. The engine component of claim 1, wherein the plurality of wear surfaces are at least one of a coating, cushion, and pad to prevent excessive wear on the plurality of part span shroud segments.

3. The engine component of claim 1, wherein the weld connection secures the part span shroud segments and secure the wear surfaces in place.

4. The engine component of claim 1, wherein the plurality of wear surfaces are attached to the corresponding airfoil by the weld connections.

5. The engine component of claim 1, wherein the plurality of part span shroud segments and the plurality of airfoils are a continuous unitary piece that are attached to the airfoil by a second weld connection.

6. The engine component of claim 1, wherein the plurality of part span shroud segments are individual segments that provide aerodynamic damping during operation of the blisk.

7. The fan blisk of claim 1, wherein the weld connection is a diffusion bond.

8. The engine component of claim 1 wherein the disk body, the plurality of airfoils, and the plurality of shroud segments are manufactured from a composite material.

9. The engine component of claim 1 wherein the disk body, the plurality of airfoils, and the plurality of shroud segments are manufactured from a metallic material.

10. An engine component comprising:
a fan blisk, the fan blisk comprising:
a disk body having a substantially circular geometry;
a plurality of circumferentially spaced apart airfoils extending radially outwardly from the disk body, each airfoil being secured to the disk body;
a plurality of shroud segments, each shroud segment being disposed circumferentially between the plurality of airfoils and configured to attach to a corresponding airfoil of the plurality of airfoils;
wherein each shroud segment is attached to another shroud segment of the plurality of shroud segments by a weld connection on a predetermined location of the shroud segment, wherein each shroud segment of the plurality of shroud segments is a part span shroud segment, and;
wherein the predetermined location of the weld connection is at a location between the disk and the end of the shroud segment, and wherein the weld connection is applied substantially perpendicular to the plurality of blade airfoils.

11. An engine component comprising:
a fan blisk, the fan blisk comprising:
a disk body having a substantially circular geometry;
a plurality of circumferentially spaced apart airfoils extending radially outwardly from the disk body, each airfoil being secured to the disk body;
a plurality of shroud segments, each shroud segment being disposed circumferentially between the plurality of airfoils and configured to attach to a corresponding airfoil of the plurality of airfoils;
wherein each shroud segment is attached to another shroud segment of the plurality of shroud segments by a weld connection on a predetermined location of the shroud segment, wherein each shroud segment of the plurality of shroud segments is a part span shroud segment, and;
wherein the predetermined location of the weld connection is at a location between the disk and the end of the shroud segment, and wherein alternating shroud segments are connected by the weld connection.

12. A method for manufacturing an engine component, the method comprising the steps of:
manufacturing a fan blisk comprising the steps of:
securing a plurality of blade airfoils to a disk;
securing a plurality of shroud segments to the plurality of blade airfoils; and
wherein the plurality of shroud segments are part span shroud segments that span at least a portion of the distance between adjacent blade airfoils, wherein the part span shroud segments extend substantially from a blade airfoil to an adjacent part span shroud segment, and wherein the part span shroud segments are attached with weld connections to adjacent part span shroud segments.

13. The method of claim 12, wherein the step of securing the plurality of blade airfoils to the disk comprises securing the plurality of blade airfoils to the disk with a weld connection.

14. The method of claim 13, wherein the weld connection is at least one of a diffusion bond, a weld from a solid state welding technique and a weld from a translational friction welding technique.

15. The method of claim 12, wherein the step of securing the plurality of blade airfoils to a disk is executed after the step of securing the plurality of shroud segments to the plurality of blade airfoils.

16. The method of claim 12, wherein the step of securing a plurality of blade airfoils to a disk is machining the plurality of blade airfoils and the disk out of a solid piece of material.

17. The method of claim 12, wherein the step of securing the plurality of shroud segments to the plurality of blade airfoils results in forming a solid ring of shrouds.

18. The method of claim 12 wherein the step of securing the plurality of blade airfoils to a disk comprises having the plurality of blade airfoils integral with the plurality of shroud segments.

19. The method of claim 12, further comprising:
having a plurality of blade airfoils, wherein each airfoil of the plurality of airfoils has two sections, a first section and a second section;
securing the first section of the airfoils to the disk before the plurality of shroud segments are secured;
securing the plurality of shroud segments to first section of the plurality of airfoils; and
securing the second section of airfoils after the plurality of shroud segments are attached to the first section of airfoils.

20. The method of claim 19, wherein the coating is made of tungsten carbide, or is a brazed on wear surface.

21. The method of claim 12, wherein the step of providing the plurality of shroud segments with a coating is before the step of securing the plurality of shroud segments to the blade airfoils.

22. The method of claim 12, wherein the step of securing the plurality of shroud segments to the plurality of blade airfoils further comprises securing the plurality of shroud segments to the plurality of blade airfoils such that every other shroud segment in the plurality of shroud segments has a gap.

23. The method of claim 12 wherein the step of securing a plurality of blade airfoils further comprises attaching two blade airfoils at a time to the disk, the plurality of airfoils being connected to each other at the shroud.

* * * * *